Dec. 26, 1961   R. MARINDIN ET AL   3,014,536
TRACTORS
Filed April 11, 1958   13 Sheets-Sheet 3

INVENTORS
ROBERT MARINDIN
HAROLD RAYMOND BENFORD
Paul O. Pippel
ATTORNEY

INVENTORS
ROBERT MARINDIN
HAROLD RAYMOND BENFORD

Paul C. Pippel
ATTORNEY

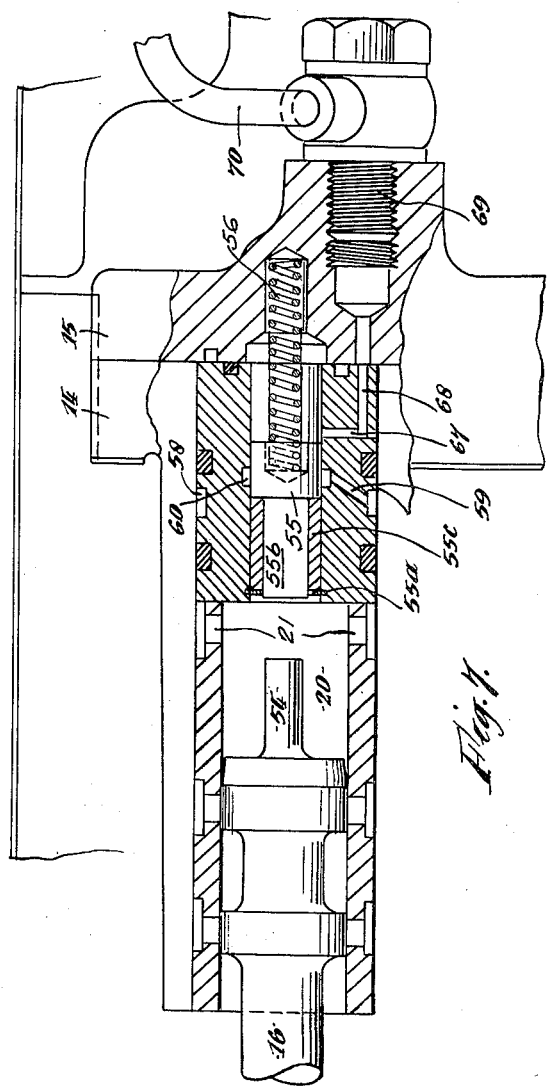

INVENTORS
ROBERT MARINDIN
HAROLD RAYMOND BENFORD

Paul O. Pippel
ATTORNEY

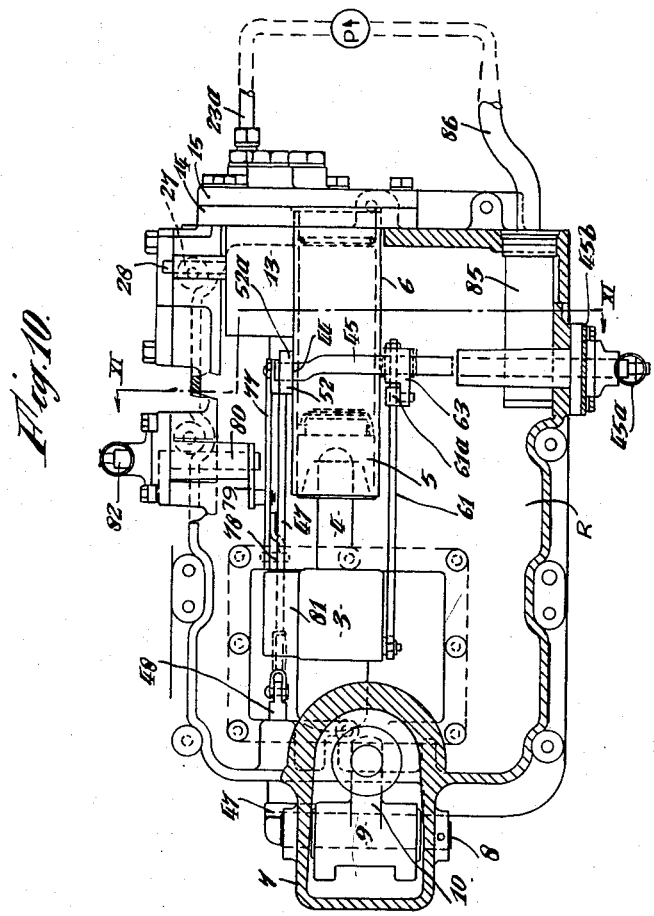

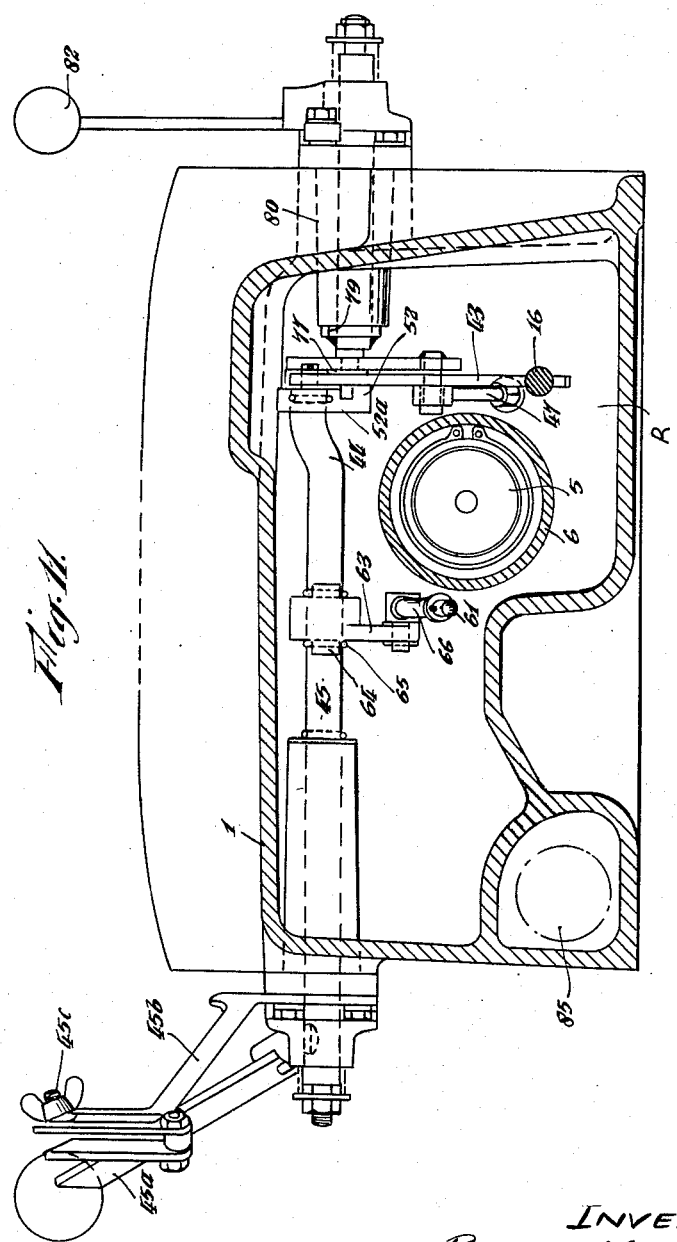

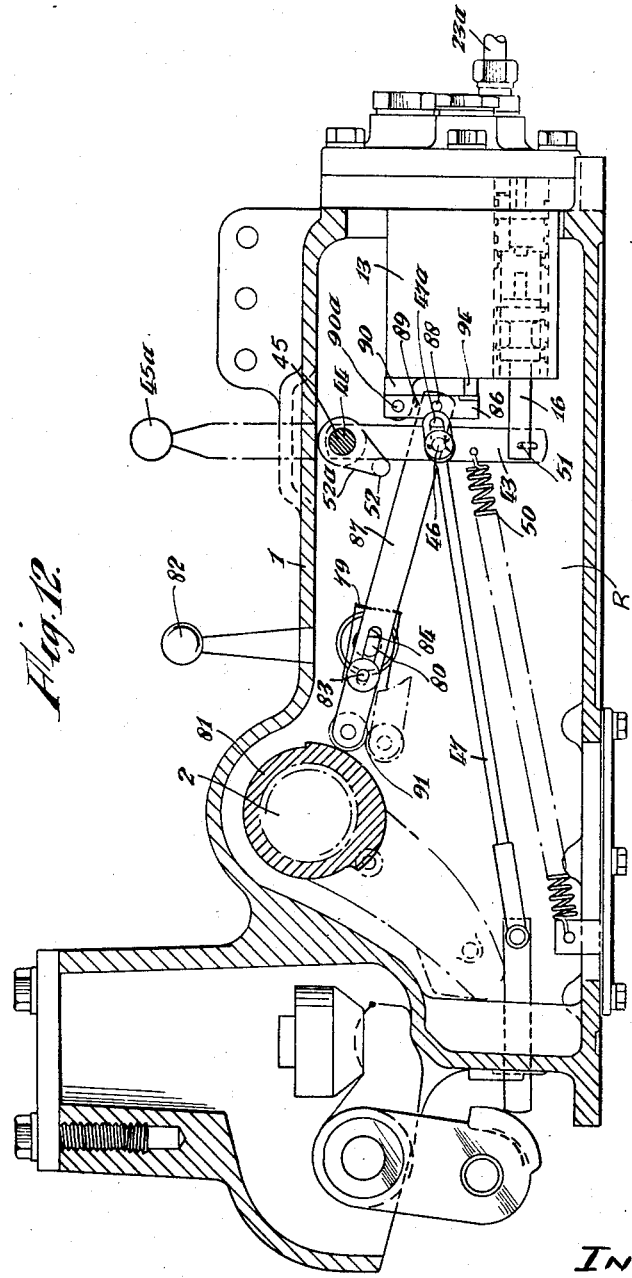

Dec. 26, 1961  R. MARINDIN ET AL  3,014,536
TRACTORS
Filed April 11, 1958  13 Sheets-Sheet 12

INVENTORS
ROBERT MARINDIN
HAROLD RAYMOND BENFORD

Paul O. Pippel
ATTORNEY

Dec. 26, 1961  R. MARINDIN ET AL  3,014,536
TRACTORS
Filed April 11, 1958  13 Sheets-Sheet 13

INVENTORS.
Robert Marindin
Harold Raymond Benford
Paul O Pippel
Atty.

3,014,536
TRACTORS

Robert Marindin, Sprotborough, Doncaster, and Harold R. Benford, Hexthorpe, Doncaster, England, assignors to International Harvester Company, Chicago, Ill., a corporation of New Jersey
Filed Apr. 11, 1958, Ser. No. 728,016
Claims priority, application Great Britain Apr. 15, 1957
18 Claims. (Cl. 172—9)

This invention relates to tractors, and is particularly concerned with improvements in tractors of the general type having a hydraulic power lift system for operating and controlling an implement-attaching linkage, e.g. of the three-point type.

Many proposals have been made for enabling an implement, such as a plough, attached to a tractor by a hydraulically controlled linkage, to be operated with maintenance of a substantially constant draft by controlling the hydraulic lift system in response to variations in draft load on the draft-responsive member, usually a movable anchorage member for the top link of a three-point linkage, the anchorage member being resiliently loaded by means such as a spring reacting against the draft load. Under uniform soil conditions, the draft load will be proportionate to the depth at which the implement is operating and thus automatic draft control involves automatic depth control and is commonly referred to as such, inasmuch as the operation of automatic draft control tends to maintain the implement at a substantially constant working depth depending on the setting of the draft control. Variations in soil density and/or undulations in ground level may cause fluctuations in working depth, but in general the effect of automatic draft control is to even out such fluctuations and maintain the implement at a steady, or substantially constant, working depth conforming as closely as possible to the selected depth determined by the setting of the automatic draft control arrangement.

The term "automatic draft control" used herein therefore includes automatic depth control when obtained by controlling the hydraulic lift system in response to variations in draft load on a draft-responsive member.

An early proposal for automatic draft control involved regulation of the pressure of hydraulic fluid supplied to the ram of a hydraulic power lift from a continuously acting pump, by means of a valve mechanically operated by a draft-responsive member so as to release pressure fluid from the power lift on reduction in draft to allow the implement to fall to increased depth and, by closing the valve, to cause the hydraulic fluid delivered under pressure from the pump to act on the power lift to raise the implement on occurrence of increase in draft, the valve also being operable by a hand control for raising and lowering the implement at random. In this proposal, the hydraulic fluid delivered under pressure by the pump is normally continuously by-passed at high pressure through the valve, and it was found that, as a result of continuously forcing the hydraulic fluid under high pressure through the restriction presented by the valve, the hydraulic fluid became over-heated and aerated at the operating pressures involved in supporting an implement from a linkage for operation with automatic draft control.

To overcome this disadvantage it was subsequently proposed to provide a control valve operated by the draft-responsive member and arranged on the suction side of the pump so that the pump, although continuously driven, is operable to supply hydraulic fluid under pressure to the hydraulic power lift system only when required for delivering fluid under pressure to the power lift system. This arrangement was designed to obviate the excessive heating and aerating of the fluid which occurred in the first proposal referred to, but it was found that control on the suction side of the pump was lacking in sensitivity in response to movements of the draft-responsive member and additional measures were found necessary in order to improve the sensitivity while retaining control on the suction side of the pump in order that the automatic draft control system should be capable of responding with sufficient speed or rapidity to relatively small movements of the draft-responsive member as found necessary in practice for fully effective automatic draft control, particularly when it is necessary to compensate for pitching movements of the tractor resulting from irregularities in surface contour of the ground.

The present invention has for its primary object to provide a power lift system embodying an improved automatic draft control arrangement whereby a high degree of sensitivity in response to changes in draft load may be obtained in a simple and effective manner.

According to the present invention, a power lift system for a tractor of the kind referred to, comprising a hydraulic pump adapted, when driven, to supply hydraulic fluid under pressure continuously, control valve means on the output side of the pump for regulating supply of hydraulic fluid under pressure to the power lift for raising an implement carried by the linkage and flow of hydraulic fluid from the power lift for lowering said implement, and means for effecting movements of said control valve means depending on movements of a draft-responsive member under the influence of draft load and resilient draft reaction means, is characterised in that the control valve means is adapted to establish or maintain a low pressure by-pass condition for the output of the pump except when operating to supply fluid under pressure to the power lift.

More specifically, the invention includes a power lift system for a tractor, comprising control valve means arranged on the output side of a hydraulic pump adapted, when driven, to supply hydraulic fluid under pressure continuously, said control valve means being operated by mechanism actuated, in response to changes in draft load, by movement of the top link of a three-point attaching linkage against resilient load reacting means so as to regulate supply of hydraulic fluid under pressure to the power lift for raising an implement carried by the linkage and flow of hydraulic fluid from the power lift for lowering said implement, said control valve means being adapted to establish or maintain a low pressure by-pass condition for the output of the pump except when operating to supply fluid under pressure to the power lift. Said mechanism may comprise a lever operatively connected at one end to the control valve means and at the other end to manually operable means, the lever being connected through a lost-motion connection to an element operated by the draft-responsive member, the lost-motion connection being arranged so that the lever may be moved by the manually operable means against the action of a spring independently of said element for operating the control valve means to cause the power lift to raise the implement to elevated or transport position.

The control valve means may comprise a by-pass valve communicating with a fluid pressure supply passage and normally held open to establish or maintain a low pressure by-pass condition, and a main control valve member adapted to control said by-pass valve in such manner that when the main control valve member is in a neutral position, the by-pass valve is held open, while when the main control valve is moved to an implement lift position, the by-pass valve is caused to close, whereby fluid under pressure is delivered to the ram cylinder of the power lift, while on movement of the main control valve member to an implement-lowering position, the ram cylinder is placed in communication with a fluid return passage and the by-pass valve is maintained open.

More specifically, the control valve means may comprise a main valve member operable by the draft-responsive member, a port controlled by the main valve member and communicating through a passage with the ram cylinder of the power lift, a supply passage communicating with the output of the pump, said supply passage communicating with said first-mentioned passage through a non-return valve and also communicating through a by-pass valve with a fluid return passage, said by-pass valve being normally held open by means of a piston member under the influence of pressure fluid delivered from said supply passage through a restriction, and a second port controlled by the main valve member in such manner that when the main valve member is moved to the lift position, fluid pressure on the said piston is released to allow the by-pass valve to close whereby hydraulic fluid under pressure is delivered through said non-return valve to the ram cylinder.

In power lift systems embodying automatic draft control, it is usual to provide an overload release means operated by the draft-responsive member in such manner that on the occurrence of draft overload such as may occur when the implement encounters an obstruction, such as a tree root, rock or the like, the tractive effort of the tractor is reduced or cut off so as to avoid excessive strain and possibility of consequential damage to the implement and/or to the tractor.

One conventional form of overload release involves venting of hydraulic fluid from the ram cylinder of the power lift so that the tractor is relieved of the proportion of the weight of the implement normally transferred to the tractor through the power lift system. The reduction in load allows the rear driving wheels of the tractor to slip and thus reduce the tractive effort.

The control valve means may incorporate overload release means of this character, and to this end may comprise an additional valve member operable against the action of a spring by the main control valve member when moved to an extreme position on occurrence of overload, to place the ram cylinder of the power lift in communication with a fluid return passage. The additional valve member may comprise a valve plunger in axial alignment with the main valve member and operable by a projection on the main valve member to open ports permitting return flow of fluid from the ram cylinder to a reservoir.

Another form of overload release involves actuation of the main clutch of the tractor to disengage the drive on occurrence of overload.

Hydraulic clutch-disengaging means according to the co-pending application Serial No. 722,020, filed March 17, 1958, now abandoned, may be actuated by modifying the control valve means so that the additional valve member, when actuated by the main control valve member, opens a port to place the fluid pressure supply passage in communication with hydraulic clutch-operating means.

Manually operable means may be provided for moving the main control valve member to the lift position independently of the automatic draft control, and in order to automatically return the main control valve member to the neutral position when the implement reaches an upper limit of travel, mechanism operable by movement of part of a cross-shaft assembly of the hydraulic power lift is arranged to act on said manually operable means to restore it to a neutral position when the implement reaches a predetermined height.

For certain operations it is desirable that it should be possible to support the implement at a predetermined height relative to the tractor without the operation of automatic draft control. This involves bringing into action, by manually operable means, an alternative position control which enables the implement to be set and maintained at a predetermined height according to a selected setting of a manual control member.

In one form the alternative position control may be of the known type in which alternatively available means is provided for the operation of the control valve means so that the implement will be raised or lowered by the power lift to follow with fidelity the movement of a manually operated control member.

The present invention has among its objects to provide an improved and simplified construction of alternative position control.

According to the invention, an alternative position control comprises a link member pivotally connected to the operating lever of the valve control means, conveniently at the same point as the element operated by the draft-responsive member, said link being operable by an additional manual control so as to be movable from an inoperative position, in which it has no influence on the automatic draft control mechanism, to a position in which a roller on the link coacts with a cam mounted to rotate with the cross-shaft of the power lift, the arrangement being such that as the manually operable means acting on said lever is moved to operate the control valve means to lower the implement, the action of the cam on said link will return the control valve means to the neutral position when the implement has reached a depth corresponding to the setting of said manually operable means. The power lift will follow any movement of the manually operable means, either up or down, and when the implement is in a lower working position at the selected depth, the automatic draft control is rendered inoperative in so far as, if any draft load is present in the top link, it can only over-ride the position control if this load increases to such an extent that, if the tractor were being operated with draft control, the increase in draft would be sufficient to cause the system to be put to lift at that particular setting. Extreme increase of draft will cause the draft-responsive member to act through the automatic draft control mechanism to actuate the overload release. Return of the manually operable means to the neutral position when the implement is raised to an upper limit of travel also remains unaffected.

A further object of the invention is to provide an alternative selective height, or depth, control which offers an important advantage over the conventional position control in that the height control may be used completely independently of the automatic draft control, or with the automatic draft control having an over-riding action of any desired degree.

The alternative height, or depth, control may comprise a link movable by a manual depth-limiting control between inoperative and operative positions in relation to a cam movable with the cross-shaft of the power lift and cooperating with a roller at one end of the link, the other end of which operates an auxiliary valve of the control valve means, the auxiliary valve being actuated by said cam acting through said link to shut off return flow of fluid from the ram cylinder when the implement reaches a predetermined depth, dependent on the selected position of the link in relation to the cam, and the auxiliary valve, when the link is in the inoperative position, being maintained by spring means in such a position that flow of fluid from the ram cylinder is controlled solely by the main control valve means. Thus, when working with automatic draft control, the depth-limiting control will be inoperative. When working with depth-limiting control, lowering is effected by movement of the manually operable means acting on said control valve means whereby, dependent on the setting of said manually operable means, a variable degree of automatic draft control may be obtained in combination with the depth-limiting control. For example, if the manually operable means is set at the point where lowering commences, corresponding to a shallow depth setting when automatic draft control is in operation, only a light draft load on the draft-responsive member will be sufficient to over-ride the depth-limiting control and actuate the control valve means. If the manually operable means is moved beyond the lowering position to a position corresponding to full depth setting with automatic draft control, the automatic draft control will have little or no over-riding action on the depth-limiting control. Between these two limits there is a wide range of control whereby, when working with depth-limiting control, automatic draft control may come into action on occurrence of a predetermined degree of excess draft to lift the implement and reduce the draft until the draft load returns to normal. A further advantage is that the degree of draft load acting on the draft-responsive member necessary for operation of the overload release means may be selected by setting the manually operable means at a suitable position. The depth-limiting control has no influence when the implement is being lifted by movement of the manually operable means acting on said lever to the lifting position.

The depth-limiting control may be operable to cause said auxiliary valve to provide an additional hydraulic lock when the implement-attaching linkage is in a raised implement-transport position, and said manually operable means is set to a neutral position in which return flow of hydraulic fluid from the power lift is cut off by the main control valve means, thereby safeguarding against accidental lowering of the implement-attaching linkage by inadvertent movement of either the manual depth-limiting control or said manually operable means acting on the main control valve means.

The invention includes the combination, in a tractor having a three-point implement-attaching linkage controlled by a hydraulic power lift system, of automatic draft control means responsive to variations in draft load on said linkage, and hydraulic clutch release means operable by fluid under pressure in the power lift system under the control of valve means actuated by a draft-responsive member.

The invention further includes the combination, in a tractor having a three-point implement-attaching linkage controlled by a hydraulic power lift system, of manually operable control means for setting an implement carried by the linkage at a predetermined working depth, and hydraulic clutch release means operable by fluid under pressure in the power lift system under the control of valve means actuated by a draft-responsive member.

The invention also includes, in a tractor having a three-point implement-attaching linkage controlled by a hydraulic power lift system, the combination of automatic draft control mechanism responsive to variations in draft load on said linkage, alternative position control mechanism for maintaining the implement at a predetermined level, and hydraulic clutch release means operable by fluid under pressure in the power lift system under the control of valve means actuated by a draft-responsive member.

The invention is hereinafter described, by way of example with reference to the diagrammatic drawings accompanying the specifications, in which:

FIG. 7 is a fragmentary section showing the modification necessary in the control valve means shown in FIGS. 4 and 6 for the operation of hydraulic clutch-disengaging means on occurrence of overload;

FIG. 10 is a sectional plan view corresponding to FIG. 9 and, with the omission of the alternative position control, also corresponding to FIGS. 1 and 2;

FIG. 11 is a cross-section on the line xi—xi, FIG. 10;

Figure 1:
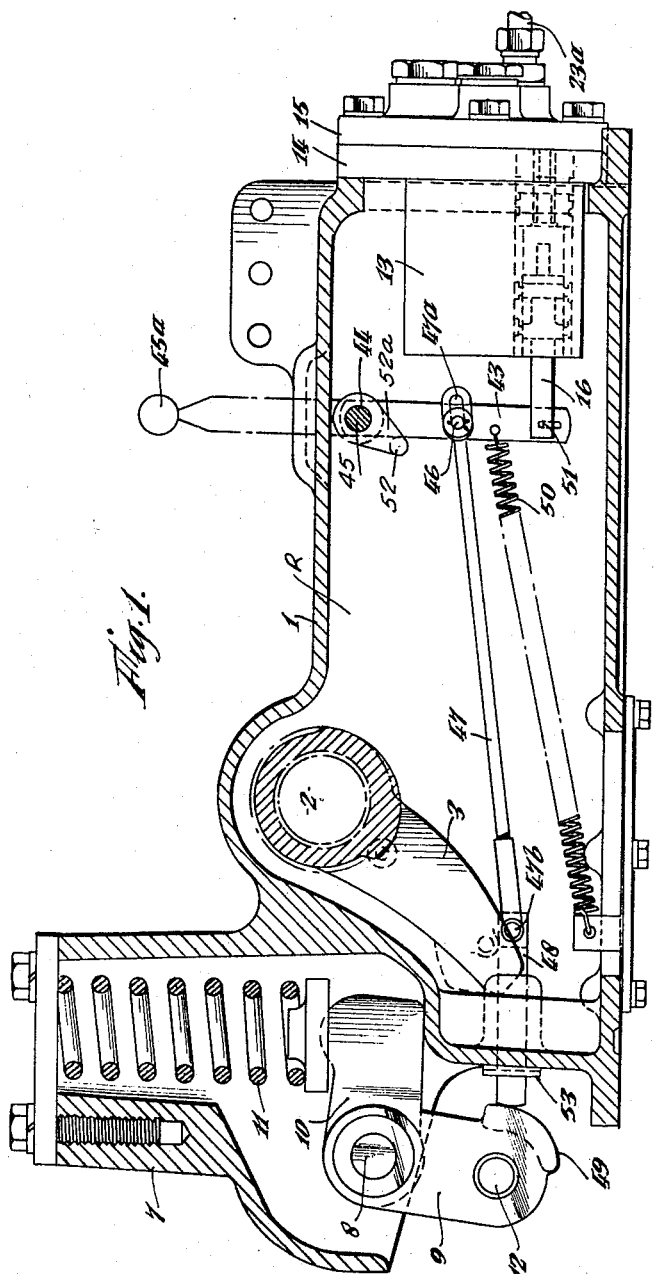
FIG. 1 is a longitudinal section illustrating one embodiment of automatic draft control means according to the invention applied to the hydraulic power lift system of a tractor for use with an implement-attaching linkage of the three-point type.
Figure 4:
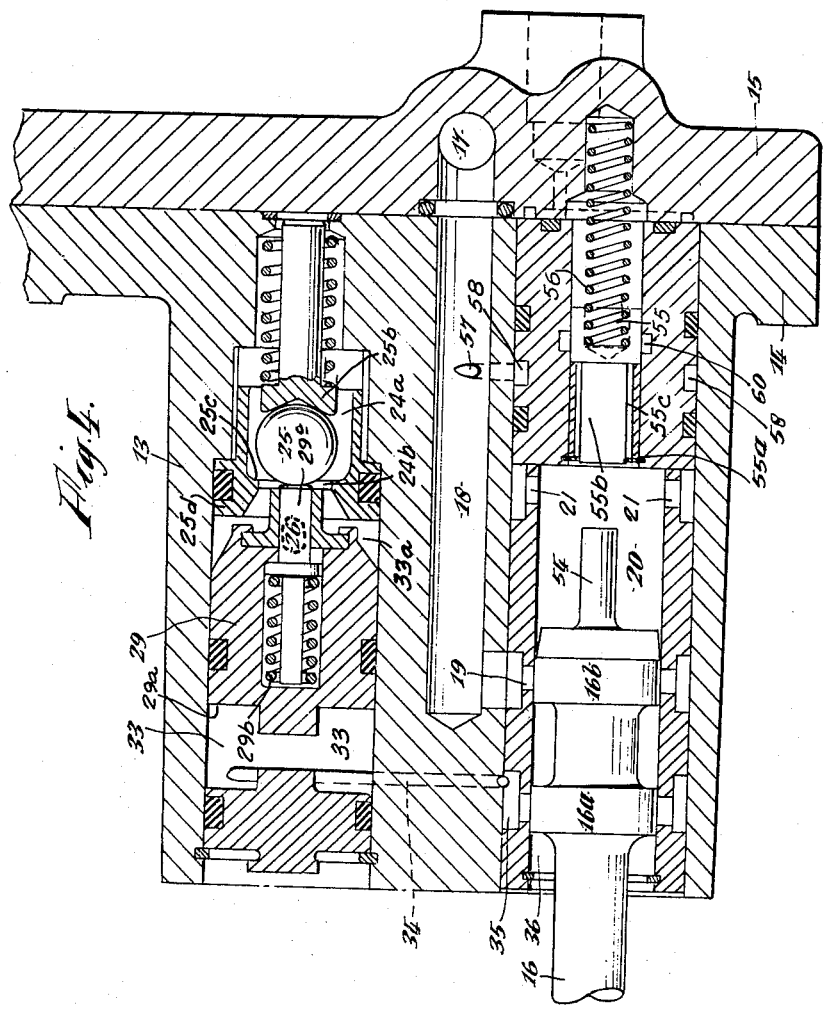
FIG. 4 is a detail section of the control valve means on the line iv—iv, FIG. 3.
Figure 13:
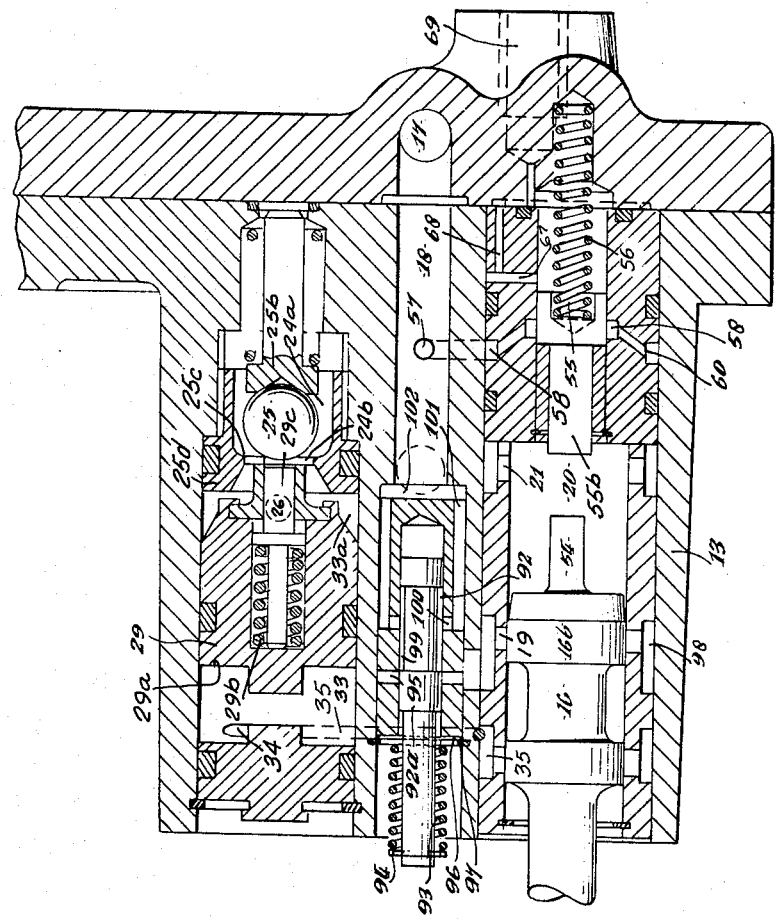
Figure 14:
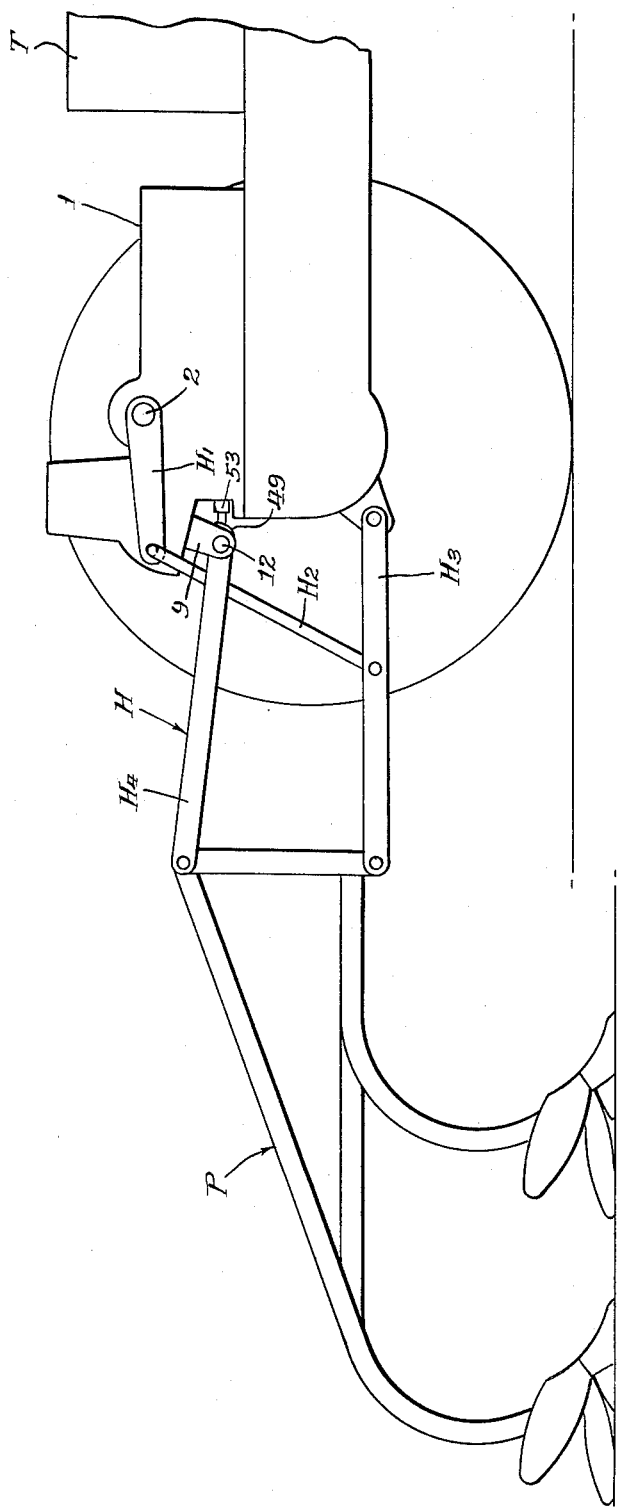

FIG. 12 is a view similar to FIG. 1 illustrating a further modification embodying a depth-limiting control in conjunction with the automatic draft control means; and FIG. 13 is a detail section corresponding to FIG. 4 showing the modification necessary in the control valve means for use with the depth-limiting control shown in FIG. 12; and FIG. 14 is a side elevational view of the rear portion of a tractor carrying an implement.

In carrying the invention into effect according to one embodiment, and as illustrated in FIGS. 1 to 6 of the drawings, the hydraulic power lift system of a tractor is housed in a casing 1 which supports a cross-shaft 2 provided with externally arranged lift arms $H_1$ and an operating arm 3 connected to a rod 4 coacting with a piston 5 (FIG. 2) disposed in a ram cylinder 6 of the power lift. The casing 1 is provided at the rear end with a housing 7 supporting a transverse pivot 8 for a bell crank lever 9 having an upper forwardly extending arm 10 coacting with a vertically disposed draft load reaction spring 11 and adapted at the lower end of the forwardly extending arm for the pivotal connection at 12 of the top link $H_4$ of a three-point linkage or hitch H having lever links $H_3$ coupled to plow P.

Figure 6:
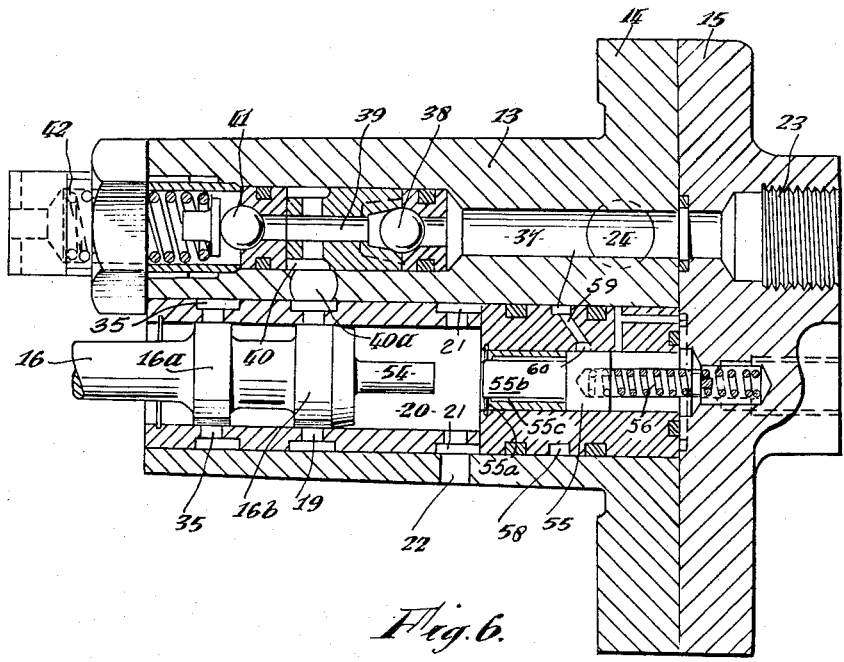
FIG. 6 is a detail section on the line vi—vi, FIG. 3.

The control valve means in the form of a unit 13 is formed integrally with an end plate 14 for the casing 1, which end plate also carries the ram cylinder 6 held in position by a cap member 15. The valve unit 13 comprises a main control valve member 16 in the form of a plunger having axially spaced lands $16a$, $16b$ (FIGS. 4 and 6). A passage 17 (FIGS. 2, 3 and 4) communicates between the ram cylinder 6 and a passage 18 in the valve unit, the passage 18 communicating with a port 19 controlled by the land $16b$ of the main valve member 16 so that, when the valve member 16 is moved from the neutral position shown in the drawings to the left for operating the power lift to lower an implement carried by the attaching linkage, the passage 18 is placed in communication with a space 20 and thence through ports 21 with a passage 22 (FIG. 6) communicating with a reservoir R within the casing 1.

Hydraulic fluid supplied from a continuously operating hydraulic pump P is delivered through a pipe $23a$ to an inlet connection 23 and thence through a passage 24 to a by-pass valve arrangement including a ball or other valve member 25 which is normally held off its seating so as to establish a low pressure by-pass condition for the hydraulic fluid delivered through the passage 24, the fluid passing out from the by-pass valve through a passage 26 and through passages 27, 28 (FIG. 3) for return to the reservoir.

The valve member 25 of the by-pass valve is normally held off its seating by a piston 29 maintained in the position shown in the drawings by pressure of fluid admitted from the passage 24 through an adjustable restriction 30 and passages 31, 32 to the cylinder space 33 behind the piston 29. The piston 29 consists of cylinder housing $29a$ containing a spring $29b$ and a plunger $29c$ which is urged by spring $29b$ outwardly of the housing $29a$ against ball valve 25 which is urged against the opposing spring loaded member $25b$ when fluid is trapped in space 33 permitting the main body of the fluid to by-pass from passage 24 to chamber $24a$ port $24b$ to chamber $33a$ and into passage 26 therein to passages 27 and 28 to the reservoir. A passage 34 also communicating with the space 33 leads to a port 35 controlled by the land 16a of the valve member 16 in such manner that, when the valve member 16 is moved from the neutral position shown to the right for operating the power lift to lift the implement, fluid can escape from the cylinder space 33 through the passage 34, port 35 and passage 36 to the reservoir. On release of pressure in the space 33 acting on the piston 29, the valve member 25 of the by-pass valve will be closed or seated against surfaces 25c of valve seat 25d by the action of a spring 25a, the piston 29 being correspondingly displaced to the left. On closing of the by-pass valve member 25, hydraulic fluid under pressure supplied through the connection 23 is diverted through a passage 37, non-return valve 38, passage 39 and port 40 through a passage 40a associated with the port 19 (FIG. 4), the fluid under pressure flowing through passages 18 and 17 to the ram cylinder 6. A relief valve 41 loaded by means of a spring 42 limits the maximum pressure in the system.

Figure 2:
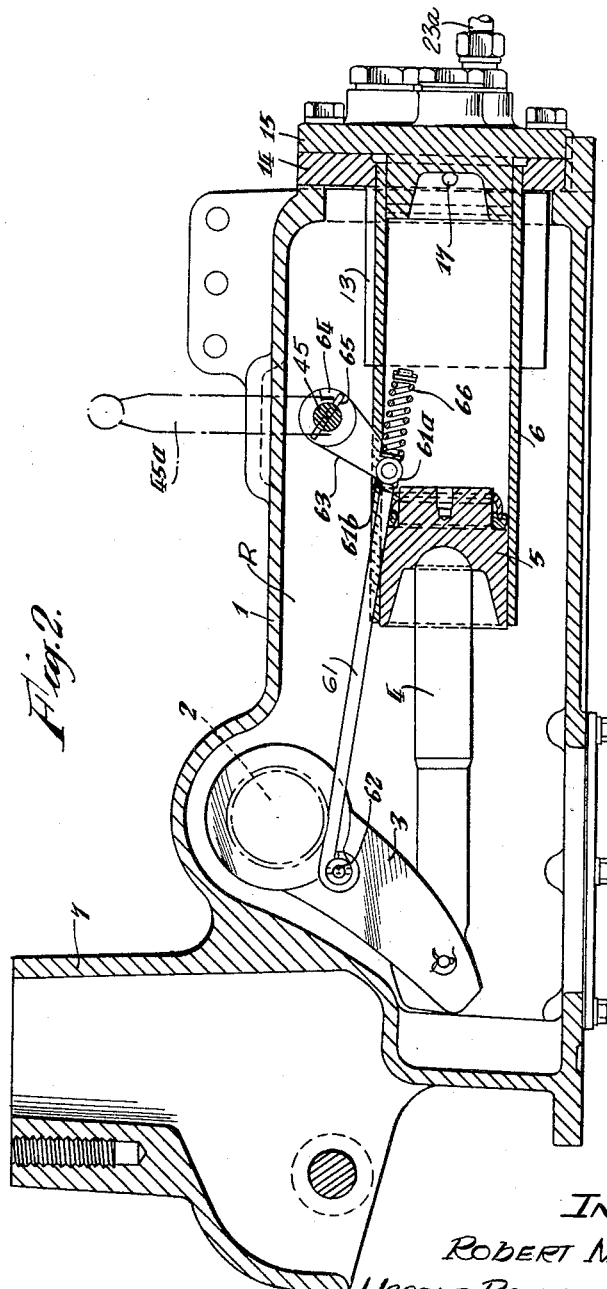
FIG. 2 is a longitudinal section in a different plane showing the hydraulic ram unit and means for returning the mechanism shown in FIG. 1 to the neutral position when the power lift reaches an upper limit of travel.
Figure 3:
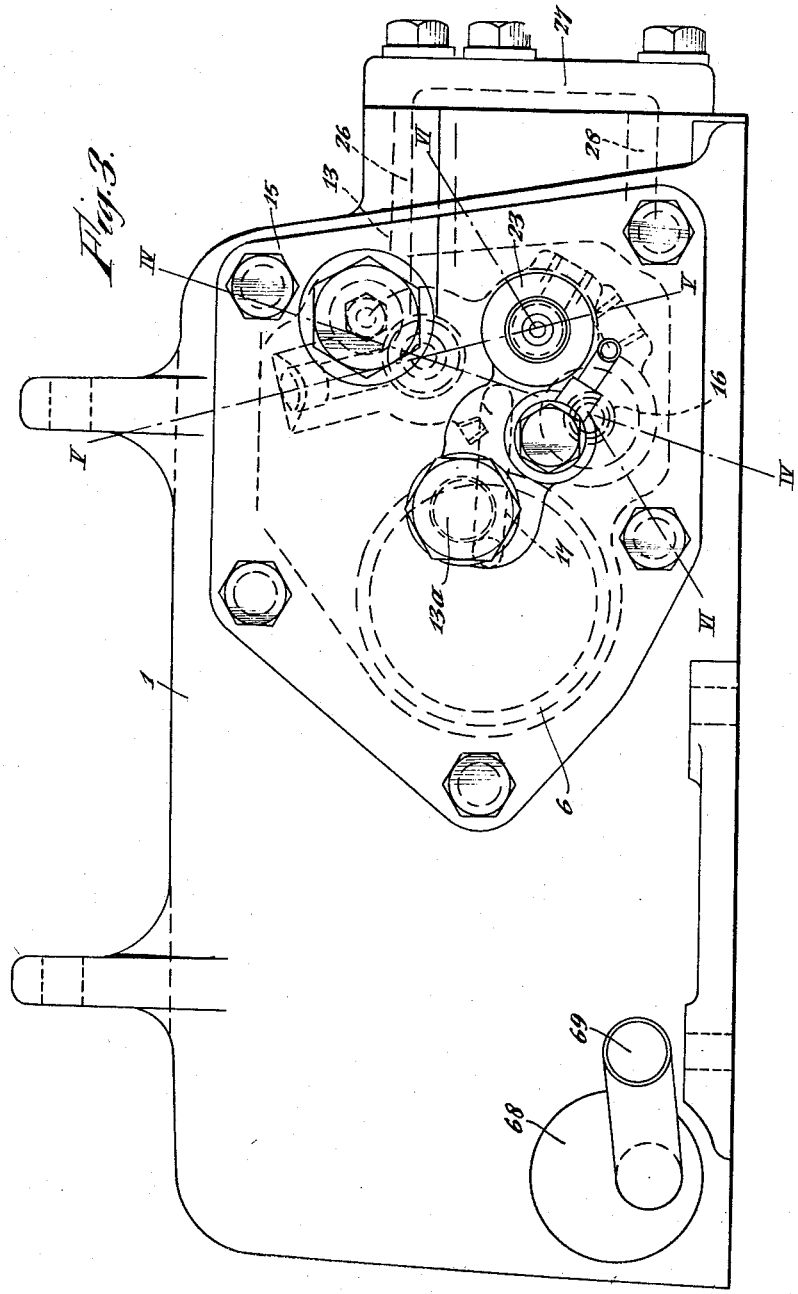
FIG. 3 is an end elevation corresponding to FIGS. 1 and 2, but drawn to an enlarged scale.

The valve member 16 is operable through a lever 43, either by the manual control for lifting or lowering, or by movement of the draft-responsive member, i.e. the bell crank lever 9, against the reaction spring 11. As shown in FIG. 1, the lever 43 is pivoted at its upper end to an upwardly cranked portion 44 of a control shaft 45 (FIG. 2). At a middle position the lever 43 is provided with a pivot pin 46 operating in a slot 47a at the end of a rod member 47 pivotally connected at 47b to a slidable member 48 coacting with a projecting part 49 of the bell crank lever 9. A spring 50 connected to the lever 43 maintains the parts normally in the position shown in FIG. 1. The lower end of the lever 43 is connected to the valve member 16 through a pin and slot connection 51. A lever member 52a rigidly connected to the crank 44 is provided with a projection 52 which coacts with the lever 43 when the shaft 45 is moved anti-clockwise by means of a manually controlled lever 45a (FIGS. 2 and 10). Any suitable friction means is provided for maintaining the control lever 45a in the position to which it is set against any force exerted by the draft control mechanism. The lost-motion provided by the slot 47a enables the lever 43 to swing about the axis of the crank 44 of the control shaft 45 against the action of the spring 50 to move the valve member 16 to the right whereby, in the manner described above, the by-pass valve member 25 is allowed to close and pressure fluid admitted to the ram cylinder 6 for exerting lift.

The operation of the arrangement described above is as follows: To lower the implement into the working position the lever 45a is moved in a clockwise direction around a quadrant 45b (FIG. 11). The corresponding movement of the crank 44 to the right allows the lever 43 to swing under the influence of the spring 50 so as to move the control valve member 16 to the left so that the land 16b uncovers the port 19 to allow fluid to escape from the ram cylinder 6. The position to which the control lever 45a is moved may be determined by an adjustable stop 45c on the quadrant 45b (FIG. 11) and this position determines the working depth of the implement at which the automatic draft control will operate.

Draft load exerted by the implement exerts compression on the top link of the linkage and, according to the amount of draft load, the bell crank lever 9 will be rotated anticlockwise around the pivot 8 against the motion of the spring 11. This movement is transmitted by the projection 49, slidable member 48 and rod member 47 to the lever 43 which swings about the axis of the crank 44 to move the control valve member 16 to the right until it reaches the neutral position shown in which the lands 16a, 16b cover the respective ports 35 and 19. In this neutral position, hydraulic fluid supplied from the pump through the pipe 23a is by-passed at low pressure back to the reservoir due to the fact that the by-pass valve member 25 is held off its seating by the action of the piston 29.

Should the draft of the implement be increased, either by an increase in soil density or by an increase in working depth due to rearward pitching movement of the tractor relative to the implement, the spring 11 will be further compressed and the rod member 47 will swing the lever 43 further to the right so as to move the valve member 16 to the right sufficiently to uncover the port 35, whereby fluid is allowed to escape from the space 33 behind the piston 29 so that the by-pass valve closes and fluid under pressure is delivered to the ram cylinder 6 to operate the power lift to raise the implement and reduce the draft. As the draft is reduced, the spring 11 will extend, and under the action of the spring 50, the lever 43 will follow the movement of the bell crank lever 9 and thus swing clockwise until the valve member 16 is again in the neutral position in which the lands 16a, 16b shut off the respective ports 35 and 19. Pressure will then again build up in the cylinder space 33 to force the piston 29 to the right to unseat the by-pass valve member 25 and thus re-establish the low pressure by-pass condition.

If the draft load imposed by the implement is decreased, either by a decrease in soil density or by a decrease in working depth due to the tractor pitching forwardly in relation to the implement, the spring 11 will extend according to the amount of decrease in the draft load, and under the influence of the spring 50 the lever 43 will be allowed to swing clockwise about the axis of the crank 44, with the result that the control valve member 16 is moved to the left sufficiently for the land 16b to uncover the port 19 and thus allow fluid to escape from the ram cylinder through the passages 17, 18, port 19, space 20, port 21 and passage 22. Although the port 35 will at the same time be uncovered by the land 16a, fluid cannot flow from the port 35 and pressure will therefore be maintained in the cylinder space 33 so that the piston 29 will continue to hold the by-pass valve member 25 off its seating to enable fluid delivered from the pump to be by-passed at low pressure back to the reservoir.

Figure 5:
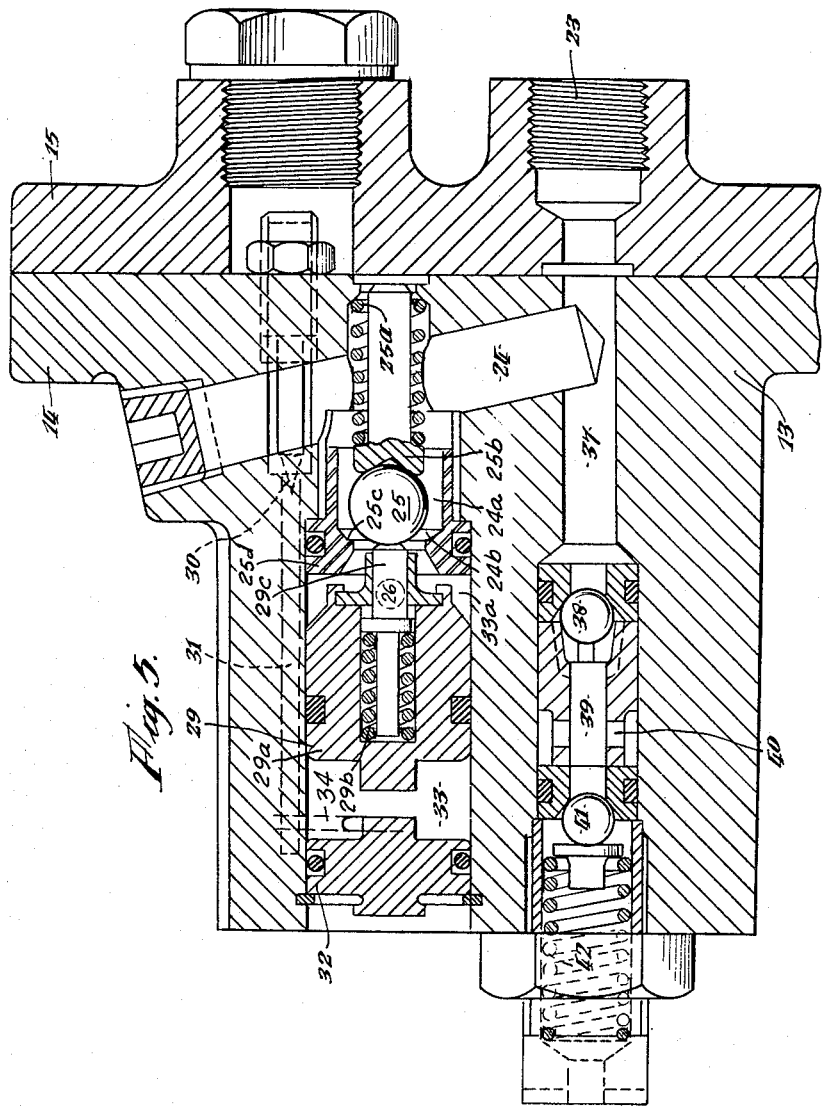
FIG. 5 is a detail section on the line v—v, FIG. 3.

In order to prevent excessive strains and possible damage to the implement and/or to the tractor in the event of the implement encountering an obstruction, such as a tree root, rock or the like, overload release means is provided. In one embodiment, as illustrated in FIGS. 4, 5 and 6, an additional piston valve 55 having a stem portion 55b is disposed co-axial with the main control valve member 16 and is normally maintained in the position shown in FIGS. 4 and 6 by means of a spring 56 so that the piston valve 55 is located by means of a circlip 55a. On occurrence of draft overload, the spring 11 will be suddenly compressed to such an extent that the projection 49 on the bell crank lever 9 will contact an abutment 53. The members 47, 48 will thereby be moved to the extreme right and the lever 43 will swing about the axis of the crank 44 to move the valve member 16 to the right to such an extent that an axial projection 54 being of a smaller axial diameter or less thickness than the axial diameter or thickness of the stem portion 55b of valve 55 as seen in the FIGURES 4 and 6 to permit any fluid in chamber 55c to enter space 20 and located on the valve member 16 will engage the stem portion 55b and move the piston valve 55 to uncover a port 60 which communicates through a passage 59 (FIG. 6) with a groove 58 communicating with a passage 57 leading from the passage 18 communicating with the ram cylinder through the passage 17. When the piston valve 55 uncovers the port 60, fluid can flow back from the ram cylinder 6 through the passages 17, 18 and 57, groove 58, passage 59, port 60 into the space 20 and thence through the port 21 and passage 22 back to the reservoir. As a result, the pressure of fluid in the ram cylinder 6 will fall to the back pressure of the system and the power lift will be inoperative to transfer any part of the weight of the implement to the rear wheels of the tractor which will then be able to slip to reduce the tractive effort. Due to restriction to flow of fluid past the valve 55 to the space 20, a back pressure is created which exerts sufficient force on the differential areas of the valve 55 to force it to the extreme right position where it will be maintained by flow of fluid under pressure from the pump to the reservoir by way of the space 20 until the control valve means is operated to the lowering position. This will prevent alternate applications of lifting force and overload release due to the tractor recoiling from the obstruction.

To clear the obstruction, the tractor is reversed and the consequent reversal of draft load will allow the spring 11 to extend and the lever 43 to move under the influence of the spring 50 to cause the valve member 16 to move to the left, whereupon the piston valve 55 will be returned by its spring 56 so as to again close the port 60. The manually controlled lever 45a can then be operated to lift the implement so that it can be carried over the obstruction. For lifting the implement, the control lever 45a is moved from the neutral position shown in FIG. 2 anti-clockwise so that the projection 52 on the lever 52a swings the lever 43 to the right to move the control valve member 16 to the lifting position.

It is desirable that supply of hydraulic fluid under pressure to the ram cylinder 6 should be automatically cut off when the power lift reaches an upper limit of travel. For this purpose, as shown in FIG. 2, an arm 63, loose on the shaft 45, is provided with an abutment 64 arranged to coact with a diametric pin 65 projecting from the shaft 45. The lever 63 is pivoted to a member 61a slidable on a rod 61 and normally held against a collar 61b by means of a spring 66. The link 61 is pivotally connected at 62 to a movable part of the cross-shaft assembly. When the power lift reaches the upper limit of its travel, the lever 63 is moved in a clockwise direction by the rod 61 so that the abutment 64 contacts the projecting part of the pin 65 and turns the shaft 45 in a clockwise direction to bring the control lever 45a and consequently the valve member 16, back to the neutral position. In FIG. 2, the power lift is shown at its upper limit of travel with the control lever 45a returned to the neutral position. The spring 66 is of sufficient strength to transmit motion from the rod 61 to the shaft 45 against resistance of said frictional means, but enables the control lever 45a to be moved to the lift position when the power lift is at its upper limit so that hydraulic fluid under pressure will be available at an auxiliary tapping 13a (FIG. 3) communicating with the passage 17 for the operation of any auxiliary apparatus. Immediately the lever 45a is released, the spring 66 will act to return it to the neutral position.

Figure 8:
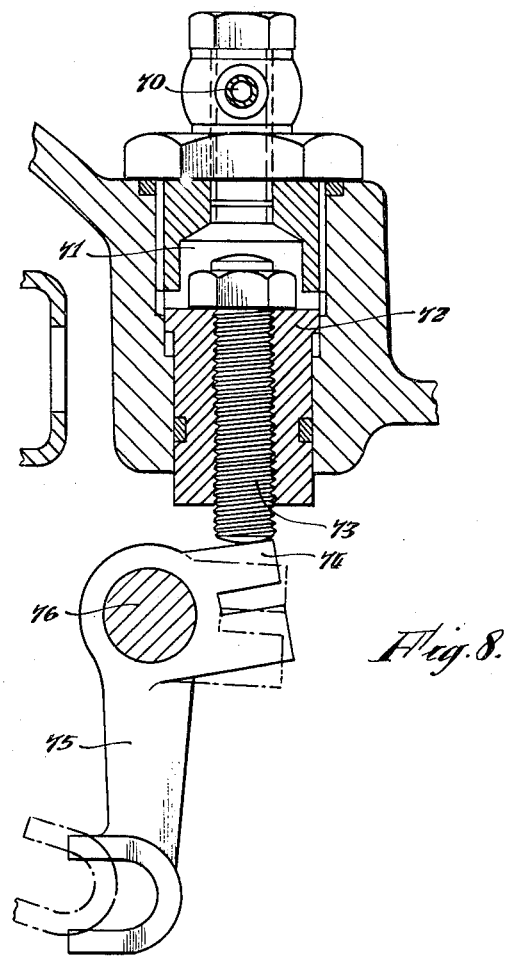
FIG. 8 is a sectional detail view showing a preferred form of hydraulic clutch-operating means.

An alternative form of overload release means is illustrated in FIGS. 7 and 8. As shown in FIG. 7, the control valve means 13 is modified as regards the construction and arrangement of the piston valve 55. As shown in FIG. 7, the piston valve 55 has the stem portion 55b fitting closely but slidable in a sleeve 55c located by the circlip 55a. Thus, when the piston valve 55 uncovers the port 60, fluid cannot flow back to the reservoir via the space 20 and port 21. When the piston valve 55 is operated by the projection 54 on the control valve member 16 on occurrence of overload, the piston valve 55 moves to the right against the action of the spring 56 until the port 60 communicates through a passage 67 and passage 68 with a connection 69 for a conduit 70. Fluid under pressure in the ram cylinder 6 can then flow through the passage 57 (FIG. 4) to the groove 58, thence through the passage 59 to the port 60 and from thence through the passages 67, 68 to the conduit 70.

Fluid under pressure supplied through the conduit 70 enters a pressure chamber 71 of the clutch-disengaging means shown in FIG. 8. Pressure in the chamber 71 acts on a piston 72 having an adjustable screw 73 which presses against an abutment 74 of a clutch-withdrawal lever 75 mounted on a shaft 76 and co-operating with clutch-withdrawal mechanism in any suitable manner.

To clear an obstruction, the clutch is held disengaged by the normal clutch-operating pedal, the control lever 45a is operated to move the control valve member 16 to the left so that pressure fluid is vented from the ram cylinder 6 and consequently from the pressure space 71. The tractor is then reversed by engaging reverse gear and releasing the clutch pedal, whereupon the clutch springs will return the lever 75 and piston 72 to the initial position with corresponding return flow of fluid through the conduit 70. The power lift can then be operated to raise the implement so that it can be carried over the obstruction.

Figure 9:
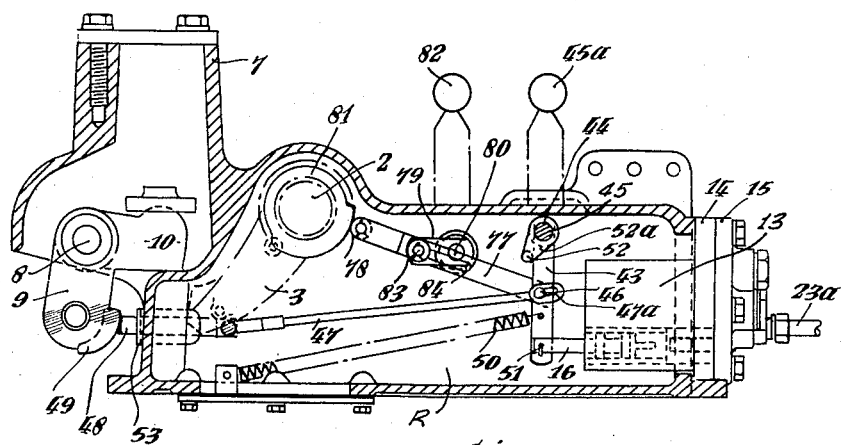
FIG. 9 is a longitudinal section similar to FIG. 1 illustrating a modification in which an alternative position control is provided.

In the modification illustrated in FIGS. 9, 10 and 11, the automatic draft control hereinbefore described is combined with an alternative position control. A link 77 pivoted at one end to the lever 43, e.g. by the pin 46, and at the other end provided with a roller 78, is operable by means of a crank 79 on a shaft 80 so as to be movable between the operative position shown in FIG. 9 and an inoperative position in which the link 77 is swung down about the axis of the pivot 46 so that the roller 78 cannot be contacted by a cam 81 rotating with the cross-shaft 2. The shaft 80 is operated by a selector lever 82 the crank having a pin 83 engaging a slot 84 in the link 77.

The remainder of the mechanism is identical with that described with reference to FIGS. 1 and 2 and the control valve means 13 is constructed and adapted to operate as described with reference to FIGS. 4, 5 and 6, if desired, with the clutch-disengaging means shown in FIGS. 7 and 8. FIG. 10 shows a filter 85 located in the lower part of the casing 1 and from which fluid is supplied to the pump (not shown) through a conduit 86.

When the link 77 is lowered to the inoperative position wherein the roller 78 cannot contact the ram 81, the automatic draft control functions in the manner before described. When, however, the control lever 82 is moved to position the link 77 as shown in FIG. 9, the position control mechanism will over-ride the action of the draft control mechanism so as to render it inoperative except for actuation of the overload release means when the projection 49 on the lever 9 moves to the full extent up to the abutment 53.

When working with position control, the control lever 45a determines the height or working depth at which the implement is set, and the power lift will be operated automatically to follow any movement of the control lever 45a either up or down. The action is as follows: To lower the implement to a predetermined extent, the control lever 45a is moved from the neutral position clockwise to a position on the quadrant 45b which may be determined by setting of the adjustable stop 45c. Consequential movement of the crank 44 causes the lever 45 to swing clockwise about the pivot 46 so that the control valve member 16 will move to the left and, in the manner before described, allow fluid to flow from the ram cylinder 6. The spring 50 acts to maintain the roller 78 in contact with the cam 81 and as the cross-shaft 2 rotates to lower the implement, the cam 81 forces the link 77 to the right and thus swings the lever 43 to the right about the axis of the crank 44. When the implement falls to a position corresponding to the setting of the control lever 45a, the action of the cam 81 will have caused the control valve member 16 to return to the neutral position.

If the control lever 45a is thereafter moved back towards its neutral position, the valve member 16 will be moved from the neutral position to the right so that the power lift will operate in the manner before described to raise the implement. As the cam 81 rotates during the lifting movement, the spring 50 causes the lever 43 and valve member 16 to follow the movement of the roller 78 contacting the cam 81 and the valve 16 will be returned to the neutral position when the implement height corresponds to the setting of the control lever 45a.

When the parts are in the neutral and transport position shown in FIG. 9, and if, due to leakage, any lowering movement of the power lift takes place, the action of the cam 81 will operate the valve member 16 to check the lowering movement and cause the power lift to return to its upper limit of travel. This safeguards against any possibility of the power lift allowing the implement to fall to the ground while being transported.

In a further modification, illustrated in FIGS. 12 and 13, the automatic draft control described with reference to FIGS. 1 to 8 is used in conjunction with an alternative selective height, or depth, control which may be used completely independently of the automatic draft control or with the automatic draft control having an over-riding action on occurrence of a selected amount of excess draft load variable within wide limits as may be required. As shown in FIG. 12, a link 87 is pivoted at 88 to a lever 89 depending from, and pivoted at 90a to, a projection 90 on the control valve unit 13, and at the other end is provided with a roller 91 coacting with a cam, such as the cam 81, mounted on the power lift cross-shaft 2. The link 87 can be swung upwards or downwards about the pivot 88 by means such as described with reference to FIG. 9, comprising a crank 79 having a crank pin 83 engaging a slot 84 in the link, the crank being fixed to a shaft 80 operable by a control lever, such as the lever 82 shown in FIG. 10.

As shown in FIG. 13, the control valve unit 13 is substantially as before described with reference to FIG. 4, but is modified by the provision of an auxiliary piston valve 92 which is normally urged towards the left by a spring 93 so that a projecting end portion 94 of the valve 92 abuts the lower end 86 of the lever 89. A land 92a of the piston valve 90 controls a port 95. Normally, when automatic draft control is in operation and the link 87 is in an inoperative position where it is swung down so that the roller 91 cannot be contacted by the cam 81, the piston valve 92 is positioned by a washer 96 held in place by a circlip 97, and the port 95 is open. The port 19 with which the land 16b of the main control valve member co-operates, is in communication with the port 95 through a passage 98 while the port 95 is in communication with the passage 18 through a passage 99 surrounding an intermediate reduced portion of the piston valve 92, a port 100, passage 101 and passage 102.

Frictional positioning means is provided for the control lever 82. The frictional positioning means for both the levers 45a and 82 may comprise a spring-loaded friction washer.

The operation of the arrangement shown in FIGS. 12 and 13 is as follows: If the control lever 82 is moved anti-clockwise so that the link 87 is swung down to a lowermost position, the roller 91 cannot be contacted by the cam 81 and the automatic draft control mechanism will function as before described with reference to FIGS. 1 to 6. If, however, it is desired to operate with the implement at a selected depth, the control lever 82 is positioned so that when the control lever 45a is moved clockwise from its neutral position to lower the implement, the implement falls to a depth corresponding to the setting of the lever 82, the cam 81 contacting the roller 91 and moving the link 87 to the right to operate the auxiliary piston valve 92 to shut off return flow of fluid from the ram cylinder 6. If the control lever 82 is then moved anti-clockwise the implement will follow movement of the lever 82 and fall further until the cam 81 again acts to move the auxiliary piston valve 92 to shut off the port 95. Movement of the control lever 82 in the clockwise direction from the setting for the selected depth has no effect as regards lifting the implement, lifting and lowering of the implement being controlled by the lever 45a acting through the lever 43 on the main control valve member 16 in the manner before described. If the lever 45a is set at the point where lowering commences, a relatively light draft load will be sufficient to over-ride the depth-limiting control so that the valve member 16 is operated to raise the implement and thereby reduce the draft. Lifting of the implement from the depth determined by the setting of the control lever 82 causes the cam 81 to retract relatively to the roller 91 so that the auxiliary piston valve 92 moves to open the port 95. Thus, when the draft is reduced sufficiently for the automatic draft control mechanism to operate in the reverse direction to move the main control valve member 16 to the implement-lowering position, the port 95, being open, permits return flow of fluid from the ram cylinder 6 until the port 95 is again shut off by the action of the cam 81 when the implement reaches the depth determined by the setting of the control lever 82. If the control lever 45a is moved clockwise to the position corresponding to full depth setting when operating with automatic draft control, the draft necessary to cause the automatic draft control mechanism to over-ride the depth-limiting control will be so great that over-riding will never occur. Between these two limits there is a wide range in which the amount of draft load necessary to cause the automatic draft control mechanism to over-ride the depth-limiting control is variable at will. The general effect of the arrangement is to enable an implement to be operated at a selected depth determined by the setting of the lever 82 and providing means whereby an increase in depth together with an increase in draft will be prevented until conditions return to normal, whereupon the implement is returned to the selected depth setting.

In a similar manner, the setting of the lever 45a controls the amount of draft overload necessary to operate the valve 55 of the overload release means.

By the arrangement described, one control lever, 82, is operable to bring the depth-limiting control into action for the selection of a predetermined working depth, while the other lever, 45a, controls lifting and lowering of the implement and also enables the automatic draft control mechanism to be brought into action, if desired, to over-ride the action of the depth-limiting control to a variable degree which can be selected at the will of the operator.

The control lever 82 may be operated to provide an additional safeguard against inadvertent lowering of an implement when raised to the transport position. Instead of moving the lever 82 anti-clockwise to the extreme position for operation with automatic draft control as before described, the depth-limiting control may be put out of action by moving the lever 82 clockwise until the roller 91 is raised sufficiently to prevent the cam 81 coming into contact with the roller 91 when the shaft 2 rotates anti-clockwise when operating with automatic draft control. By moving the lever 82 anti-clockwise to a sufficient extent to cause the pin 82 to engage the right-hand end of the slot 84 and moving the link 87 to the right, the auxiliary valve 92 will be displaced so that the land 92a thereof obstructs the ports 95, thus preventing return flow of hydraulic fluid from the ram cylinder 6 by way of the ports 100, passage 99, ports 95 and 98, valve 16 and ports 21 to the reservoir. When transporting an implement, the valve 16 would be in the position shown in FIG. 13 and with the valve 92 disposed to the right so that the ports 95 are disposed substantially centrally of the land 92a. The hydraulic lock provided by the valve 16 obstructs return flow of fluid from the cylinder 6 and is supplemented by the auxiliary hydraulic lock afforded by the closure of the port 95 by the land 92a of the valve 92. If either of the levers 82 or 45a is accidentally moved, one or other of the valves 16 and 92 will remain closed, and as lowering could only occur when both these valves are open, inadvertent lowering of the implement is prevented.

It will be understood that the invention is not limited to the particular embodiments hereinbefore described. For example, the control valve means and the mechanism

We claim:

1. The combination of a tractor having a power lift device thereon operative to swing vertically an implement hitch on the tractor and control valve means porting fluid under pressure to the device for raising the hitch and exhausting fluid from the device for lowering the hitch and terminating fluid flow with the device to place the latter in a neutral position, draft responsive link means having connection with the hitch and transmitting variations in draft load to the valve means and said tractor having manually operable means including a first link portion and a movable second link portion connected to the valve means and pivotally connected to the first portion, said manually operable means positioning the valve means to port to and exhaust from and terminate fluid flow to the lift device and having adjustable abutment means to limit the movement of said second portion and the movement of the control valve means thereby, and biasing means connected to the second portion urging the second portion against the abutment means, said draft responsive means having a draft link connected with the second portion, and a lever pivoted on the tractor and connected with the hitch and having engagement with the draft link, and resilient means mounted on the tractor and urging the lever away from the draft link, the biasing means holding the draft link in engagement with the lever.

2. In a tractor having an implement hitch carrying an associated implement and hydraulic means comprising a power lift device operable by fluid under pressure to raise and lower the implement, said hydraulic means also comprising a control valve means having a lift position to transmit fluid to the lift device for raising the implement, a drop position to exhaust fluid from the lift device for lowering the implement, and a neutral position to terminate fluid communication to the lift device for holding the implement in a rest position, draft control means for raising the implement upon draft increase and lowering the implement upon draft decrease and including a draft responsive element having connection with the hitch, mechanism mounted on the tractor operating the control valve means and including a lever being connected at one end to the control valve means and a manually operable means being pivotally connected with the other end of the lever and having an abutment, and biasing means connected with the lever and urging it against the abutment in a direction of movement of the control valve means to a lowering position, said lever having a lost motion connection intermediate its ends with the element for operation by the manual means independently of the element.

3. In a prime mover having an implement mounting hitch, power lift means connected to said hitch operative to raise and lower same, hydraulic means connected with said hitch and in communication with the lift means for supplying pressure fluid thereto and including a control valve means having a valve member positionable in lift and lower and neutral positions for respectively supplying, exhausting and containing fluid in the lift means, draft responsive link means having connection with the hitch and moving said valve member upon increase in draft to fluid supplying position and upon decrease in draft to fluid exhaust position, and supplementary control means carried by the prime mover and interposed between said link means and the control valve means and comprising a first lever portion connected to the control valve means and the link means and a second lever portion, and means pivotally interconnecting the portions, said second lever portion comprising abutment means engageable with the first lever portion moving the latter in a direction transcending the operation of said draft responsive link means to its lifting position and a lever pivotally attached to the hitch and having engagement with the link means and resilient means abutting the lever in draft decreasing relation and biasing means connecting the second lever and urging the link means against the lever.

4. In a prime mover having an implement mounting hitch, power lift means connected to said hitch operative to raise and lower same, hydraulic means connected with said hitch and in communication with the lift means for supplying pressure fluid thereto and including a control valve means having a valve member positionable in lift and lower and neutral positions for respectively supplying, exhausting and containing fluid in the lift means, draft responsive link means having connection with the hitch and moving said valve member upon increase in draft to fluid supplying position and upon decrease in draft to fluid exhaust position, and supplementary control means carried by the prime mover and interposed between said link means and the control valve means and comprising a first lever portion connected to the control valve means and the link means and a second lever portion, and means pivotally interconnecting the portions, said second lever portion comprising abutment means engageable with the first lever portion moving the latter in a direction transcending the operation of said draft responsive link means to its lifting position, and said hydraulic means having a fluid reservoir and said control valve means including a cylinder and the control valve member having an axial projection and being reciprocal within the cylinder ported for communication with the reservoir, said cylinder having an axial bore in communication with the lift means, a plunger having an end portion in axail alignment with said projection and biased in said bore in a direction toward the axial projection and having a land portion in a rest position blocking fluid communication between the lift means and the reservoir and in an overload release position placing the lift means in fluid communication with the reservoir consequent upon moving the draft responsive link means into an extreme raised position whereby the projection moves the plunger in a direction expelling fluid from the power lift means.

5. In a prime mover having an implement mounting hitch, power lift means connected to said hitch operative to raise and lower same, hydraulic means connected with said hitch and in communication with the lift means for supplying pressure fluid thereto and including a control valve means having a valve member positionable in lift and lower and neutral positions for respectively supplying, exhausting and containing fluid in the lift means, draft responsive link means having connection with the hitch and moving said valve member upon increase in draft to fluid supplying position and upon decrease in draft to fluid exhaust position, and supplementary control means carried by the prime mover and interposed between said link means and the control valve means and comprising a first lever portion connected to the control valve means and the link means and a second lever portion, and means pivotally interconnecting the portions, said second lever portion comprising abutment means engageable with the first lever portion moving the latter in a direction transcending the operation of said draft responsive link means to its lifting position, and said control valve means having a fluid return passage communicating with the lift means and an overload release means carried by the prime mover comprising a valve unit interposed between the lift means and the control valve means and spring means urging the valve unit toward the member, the valve unit being operable against the action of the spring by the valve member when moved to an extreme position on occurrence of overload, to place the power lift means in communication with the fluid return passage.

6. In a prime mover having an implement mounting hitch, power lift means connected to said hitch operative to raise and lower same, hydraulic means connected with said hitch and in communication with the lift means for supplying pressure fluid thereto and including a control valve means having a valve member positionable in lift and lower and neutral positions for respectively supplying, exhausting and containing fluid in the lift means, draft responsive link means having connection with the hitch and moving said valve member upon increase in draft to fluid supplying position and upon decrease in draft to fluid exhaust position, and supplementary control means carried by the prime mover and interposed between said link means and the control valve means and comprising a first lever portion connected to the control valve means and the link means and a second lever portion, and means pivotally interconnecting the portions, said second lever portion comprising abutment means engageable with the first lever portion moving the latter in a direction transcending the operation of said draft responsive link means to its lifting position, and said lift means having a hitch position controlled operator movable thereby, said hydraulic system having a control-valve lever assembly being interposed between the operator and the control valve means and limiting movement of the latter upon a change in draft load imposed on the draft responsive link means and said control valve means having an auxiliary valve mechanism being interposed between the lift means and the valve member for controlling fluid communication therebetween, said control-valve-lever assembly having a position link engageable at its one end with the controlled operator and at its other end having connector with the valve mechanism, and a manually positionable member being connected to the link urging the valve mechanism into a hydraulically locked position to shut off return flow of fluid between the power lift means and the valve member when the implement mounting hitch moves predetermined distance dependent upon a selected positioning of the link in relation to said controlled operator.

7. In a prime mover having an implement mounting hitch, power lift means connected to said hitch operative to raise and lower same, hydraulic means connected with said hitch and in communication with the lift means for supplying pressure fluid thereto and including a control valve means having a valve member positionable in lift and lower and neutral positions for respectively supplying, exhausting and containing fluid in the lift means, draft responsive link means having connection with the hitch and moving said valve member upon increase in draft to fluid supplying position and upon decrease in draft to fluid exhaust position, and supplementary control means carried by the prime mover and interposed between said link means and the control valve means and comprising a first lever portion connected to the control valve means and the link means and a second lever portion, and means pivotally interconnecting the portions, said second lever portion comprising abutment means engageable with the first lever portion moving the latter in a direction transcending the operation of said draft responsive link means to its lifting position, and said lift means having a hitch position controlled operator movable thereby, said hydraulic system having a control-valve lever assembly being interposed between the operator and the control valve means and limiting movement of the latter upon a change in draft load imposed on the draft responsive link means and said control valve means having an auxiliary valve mechanism being interposed between the lift means and the valve member for controlling fluid communication therebetween, said control-valve-lever assembly having a position link engageable at its one end with the controlled operator and at its other end having connection with the valve mechanism, and a manually positionable member operably being connected to the link for urging the valve mechanism into a hydraulically locked position to shut off return flow of fluid between the power lift means and the valve member when the implement mounting hitch moves a predetermined distance dependent upon a selected positioning of the link in relation to said controlled operator, said auxiliary valve mechanism having a chamber communicating between the lift means and the first named valve member and a piston reciprocal within the chamber and urged in one direction toward the link whereupon movement of the controlled assembly upon lowering of the hitch urges the link to move the piston in an opposite direction for terminating fluid communication between the lift means and the valve member and thereby terminating descent of the implement.

8. In a prime mover having an implement mounting hitch, power lift means connected to said hitch operative to raise and lower same, hydraulic means connected with said hitch and in communication with the lift means for supplying pressure fluid thereto and including a control valve means having a valve member positionable in lift and lower and neutral positions for respectively supplying, exhausting and containing fluid in the lift means, draft responsive link means having connection with the hitch and moving said valve member upon increase in draft to fluid supplying position and upon decrease in draft to fluid exhaust position, and supplementary control means carried by the prime mover and interposed between said link means and the control valve means and comprising a first lever portion connected to the control valve means and the link means and a second lever portion, and means pivotally interconnecting the portions, said second lever portion comprising abutment means engageable with the first lever portion moving the latter in a direction transcending the operation of said draft responsive link means to its lifting position, and said lift means having a hitch position controlled operator movable thereby, said hydraulic system having a control-valve lever assembly being interposed between the operator and the control valve means and limiting movement of the latter upon a change in draft load imposed on the draft responsive link means and said control valve means having an auxiliary valve mechanism being interposed between the lift means and the valve member for controlling fluid communication therebetween, said control-valve-lever assembly having a position link engageable at its one end with the controlled operator and at its other end having connection with the valve mechanism, and a manually positionable member being connected to the link for urging the valve mechanism into a hydraulically locked position to shut off return flow of fluid between the power lift means and the valve member when the implement mounting hitch moves a predetermined distance dependent upon a selected positioning of the link in relation to said controlled operator, said hitch position controlled operator having a rockshaft being connected between the hitch and the power lift means and operable by the lift means and having cam means mounted on the shaft for rolling engagement with the position link.

9. In a device of the class described, an implement position control assembly including a hitch position controlled operator and hitch operating ram means connected with the operator and movable therewith, control valve means on the device operative of the ram means, linkage mounted on the device and disposed in movement reflection relationship between said controlled operator and said control valve means, and means having connection with said linkage positioning the same in operative and inoperative position with respect to said controlled operator and said control valve means comprising main and auxiliary interconnected valves and said linkage connected to an element of the auxiliary valve and said ram means having means discharging to the main valve being opened and closed by the auxiliary valve.

10. In a device of the class described, an implement position control assembly including a hitch position controlled operator and hitch operating ram means connected with the operator and movable therewith, control valve means on the device operative of the ram means, linkage mounted on the device and disposed in movement reflection relationship between said controlled operator and said control valve means, and means having connection with said linkage positioning the same in operative and inoperative position with respect to said controlled operator, and said control valve means comprising main and auxiliary interconnected valves, and said linkage including a rigid member and having a roller at one end and said controlled operator comprising a cam having engagement with the roller, and said member having a connection at its other end with said auxiliary valve and said ram means having means discharging to the main valve being opened and closed by the auxiliary valve.

11. In a device of the class described, an implement position control assembly including a hitch position controlled operator and hitch operating ram means connected with the operator and movable therewith, control valve means on the device operative of the ram means, linkage mounted on the device and disposed in movement reflection relationship between said controlled operator and said control valve means, and means having connection with said linkage positioning the same in operative and inoperative position with respect to said controlled operator, and said control valve means comprising main and auxiliary interconnected valves, and said linkage including a rigid member and having a roller at one end and said controlled operator comprising a cam having engagement with the roller, and said member having a connection at its other end with an element of said auxiliary valve, and means mounting said rigid member and including a crank having a pivotal sliding connection with said rigid member and said ram means having means discharging to the main valve being opened and closed by the auxiliary valve.

12. In a prime mover having an implement mounting hitch, power lift means connected to said hitch operative to raise and lower same, hydraulic means connected with said hitch and in communication with the lift means for supplying pressure fluid thereto and including a control valve means having a valve member positionable in lift and lower and neutral positions for respectively supplying, exhausting and containing fluid in the lift means, draft responsive link means having connection with the hitch and moving said valve member upon increase in draft to fluid supplying position and upon decrease in draft to fluid exhaust position, and supplementary control means carried by the prime mover and interposed between said link means and the control valve means and comprising a first lever portion connected to the control valve means and the link means and a second lever portion, and means pivotally interconnecting the portions, said second lever portion comprising abutment means engageable with the first lever portion, moving the latter in a direction transcending the operation of said draft responsive link means to its lifting position, said hydraulic means including a pump and reservoir, said control means having a cylinder with a first passage in communication with the pump for supplying fluid pressure to the power lift means and a second passage in communication with the reservoir for exhausting fluid from the lift means and a third passage in communication with the reservoir, the valve member being reciprocal within said cylinder and having first and second lands, said lands in neutral position closing said first and third passages for containing the fluid in the lift means, and in lift position said first land uncovering said third passage to permit fluid supply to said lift means for raising same, and in lowering position said second land uncovering the first passage to permit communication with said second passage for lowering the lift means, said hydraulic means having a non-return valve interposed between the pump and the power lift means, and bypass means communicating with the third passage and the pump, said bypass means having a by-pass valve and a valve seat, a resiliently loaded member abutting and urging one end of the valve toward the seat closing passage to the reservoir, a valve piston having one side abutting the other end of the valve and the other side of the valve piston communicating with the pump and the third passage, whereupon in bypass condition fluid under pressure from the pump urges the valve piston to unseat the valve for fluid communication with the reservoir and in termination of the bypass condition the other side of the piston is placed in communication with the cylinder for fluid discharge to the reservoir consequent upon the control valve means being moved to the lift position and said resiliently lowered member seats said valve permitting fluid under pressure to be delivered from the pump to the non-return valve to the lift means for raising said last mentioned means.

13. In a prime mover having an implement mounting hitch, power lift means connected to said hitch operative to raise and lower same, hydraulic means connected with said hitch and in communication with the lift means for supplying pressure fluid thereto and including a control valve means having a valve member positionable in lift and lower and neutral positions for respectively supplying, exhausting and containing fluid in the lift means, draft responsive link means having connection with the hitch and moving said valve member upon increase in draft to fluid supplying position and upon decrease in draft to fluid exhaust position, and supplementary control means carried by the prime mover and interposed between said link means and the control valve means and comprising a first lever portion connected to the control valve means and the link means and a second lever portion, and means pivotally interconnecting the portions, said second lever portion comprising abutment means engageable with the first lever portion moving the latter in a direction transcending the operation of said draft responsive link means to its lifting position, said hydraulic means having a pump as a source of fluid under pressure, a fluid reservoir, a non-return valve interposed between the pump and the power lift means, and the bypass means interposed between the pump and the reservoir, said bypass means having a bypass valve and valve seat, a resiliently loaded member abutting and urging one end of the valve toward the seat closing passage to the reservoir, a valve piston having one side abutting the other end of the valve and the other side of the valve piston communicating with the pump and the reservoir, the control valve member being positionable in flow obstruction relation to the reservoir, whereupon in bypass condition fluid under pressure from the pump urges the valve piston to unseat the valve for fluid communication with the reservoir and in termination of the bypass condition said other side of the piston is placed in communication with the cylinder for full discharge to the reservoir consequent upon the control valve means being moved to the lift position and said resiliently loaded member unseats said valve permitting fluid under pressure to be delivered from the pump to the non-return valve to the lift means for raising said last mentioned means.

14. In a prime mover having an implement mounting hitch, power lift means connected to said hitch operative to raise and lower same, hydraulic means connected with said hitch and in communication with the lift means for supplying pressure fluid thereto and including a control valve means having a valve member positionable in lift and lower and neutral positions for respectively supplying, exhausting and containing fluid in the lift means, draft responsive link means having connection with the hitch and moving said valve member upon increase in draft to fluid supplying position and upon decrease in draft to fluid exhaust position, and supplementary control means carried by the prime mover and interposed between said link means and the control valve means and comprising a first lever portion connected to the control valve means and the link means and a second lever portion, and means pivotally interconnecting the portions, said second lever portion comprising abutment means engageable with the first lever portion moving the latter in a direction transcending the operation of said draft responsive link means to its lifting position, the control valve means having a first passage communicating with the reservoir and being opened and closed by the valve member, and bypass means communicating with the first passage and the pump and having a valve and a second passage in communication with the reservoir and the pump and being closed by the valve as the valve member in its lift position opens said first passage.

15. In a prime mover having an implement mounting hitch, power lift means connected to said hitch operative to raise and lower same, hydraulic means connected with said hitch and in communication with the lift means for supplying pressure fluid thereto and including a control valve means having a valve member positionable in lift and lower and neutral positions for respectively supplying, exhausting and containing fluid in the lift means, draft responsive link means having connection with the hitch and moving said valve member upon increase in draft to fluid supplying position and upon decrease in draft to fluid exhaust position, and supplementary control means carried by the prime mover and interposed between said link means and the control valve means and comprising a first lever portion connected to the control valve means and the link means and a second lever portion, and means pivotally interconnecting the portions, said second lever portion comprising abutment means engageable with the first lever portion moving the latter in a direction transcending the operation of said draft responsive link means to its lifting position, the control means having a cylinder and the main valve member being reciprocal within the cylinder, a pump for delivery of fluid under high pressure to the lift means, said cylinder having a passage with the pump and the reservoir closable by the valve member, a non-return valve communicating between the pump and the lift means, the bypass means communicating with the pump and the passage and including a bypass valve and another passage communicating with the reservoir and closed by the valve in the lifting position of the valve member, and a member opposing the valve and having communication with the pump and holding the valve open under influence of fluid pressure delivered from the pump in the neutral or lowering position of the valve member and opening the non-return valve.

16. In a prime mover having an implement mounting hitch, power lift means connected to said hitch operative to raise and lower same, hydraulic means connected with said hitch and in communication with the lift means for supplying pressure fluid thereto and including a control valve means having a valve member positionable in lift and lower and neutral positions for respectively supplying, exhausting and containing fluid in the lift means, draft responsive link means having connection with the hitch and moving said valve member upon increase in draft to fluid supplying position and upon decrease in draft to fluid exhaust position, and supplementary control means carried by the prime mover and interposed between said link means and the control valve means and comprising a first lever portion connected to the control valve means and the link means and a second lever portion, and means pivotally interconnecting the portions, said second lever portion comprising abutment means engageable with the first lever portion moving the latter in a direction transcending the operation of said draft responsive link means to its lifting position, said hydraulic means having a pump as a source of fluid under pressure, a fluid reservoir, a non-return valve interposed between the pump and the power lift means, and bypass means interposed between the pump and the reservoir, said bypass means including a chamber having first and second end portions, a passage in communication with the reservoir and the second end portion in the neutral and lift positions of the valve member, said pump being in communication with the first end portion and having communication with the second end portion and the passage, a valve within the chamber intermediate the end portions thereof and having a seat between the valve and the second end portion, and means within the first end portion urging the valve to seat and means within the second end portion communicating with the third passage and unseating the valve in the neutral and lift positions of the valve member.

17. In a prime mover having an implement mounting hitch, power lift means connected to said hitch operative to raise and lower same, hydraulic means connected with said hitch and in communication with the lift means for supplying pressure fluid thereto and including a control valve means having a valve member positionable in lift and lower and neutral positions for respectively supplying, exhausting and containing fluid in the lift means, draft responsive link means having connection with the hitch and moving said valve member upon increase in draft to fluid supplying position and upon decrease in draft to fluid exhaust position, and supplementary control means carried by the prime mover and interposed between said link means and the control valve means and comprising a first lever portion connected to the control valve means and the link means and a second lever portion, and means pivotally interconnecting the portions, said second lever portion comprising abutment means engageable with the first lever portion moving the latter in a direction transcending the operation of said draft responsive link means to its lifting position, said hydraulic means including a pump and reservoir and said control means having a cylinder with a first passage in communication with the pump for supplying fluid pressure to the power lift means and a second passage in communication with the reservoir for exhausting fluid from the lift means and a third passage in communication with the reservoir, the valve member being reciprocal within said cylinder and having first and second lands, said lands in neutral position closing said first and third passages for containing the fluid in the lift means, and in lift position said first land uncovering said third passage to permit fluid supply to said lift means for raising same, and in lowering position said second land uncovering the first passage to permit communication with said second passage for lowering the lift means, said hydraulic means having a non-return valve interposed between the pump and the power lift means, and the bypass means communicating with the third passage and the pump, said bypass means including a chamber having first and second end portions, said pump being in communication with said first end portion and having communication with the second end portion and the third passage, a valve within the chamber immediate the end portions thereof and having a seat between the valve and the second end portion and means urging the valve to seat and means within the second end portion communicating with the third passage and unseating the valve in the neutral and lift positions of the valve member.

18. In a device of the class described including an implement and hitch therefor, an implement position control assembly including a hitch position controlled operator and hitch operating ram means connected with the operator and movable therewith, implement depth control means including first valve means having connection with the hitch, second valve means interposed between the ram means and the first valve means and having linkage mounted on the device and disposed in movement reflection relationship between the controlled operator and the second valve means, means having connection with said linkage for positioning the linkage in operative and inoperative position with respect to said controlled operator, and means discharging providing first passage means communicating the ram means with the second valve means and providing second passage means in the second valve means communicating the first passage means with the first valve means in certain position of the second valve means.

(References on following page)

References Cited in the file of this patent

UNITED STATES PATENTS

| Number | Name | Date |
|---|---|---|
| 2,394,210 | Sherman | Feb. 5, 1946 |
| 2,521,503 | Clark | Sept. 5, 1950 |
| 2,631,515 | McRae | Mar. 17, 1953 |
| 2,675,751 | Weber | Apr. 20, 1954 |
| 2,722,804 | Stickney | Nov. 8, 1955 |
| 2,722,873 | Garmager | Nov. 8, 1955 |
| 2,750,862 | Garmager | June 19, 1956 |
| 2,804,814 | Czarnocki | Sept. 3, 1957 |
| 2,851,938 | Giertz et al. | Sept. 16, 1958 |
| 2,864,295 | Du Shane | Dec. 16, 1958 |
| 2,887,165 | Heitshu et al. | May 19, 1959 |

FOREIGN PATENTS

| Number | Country | Date |
|---|---|---|
| 536,742 | Belgium | Apr. 15, 1955 |